B. KWARTIN
METHOD OF AND APPARATUS FOR RECORDING AND REPRODUCING SOUNDS
June 2, 1931. Original Filed Dec. 2, 1927 Re. 18,090
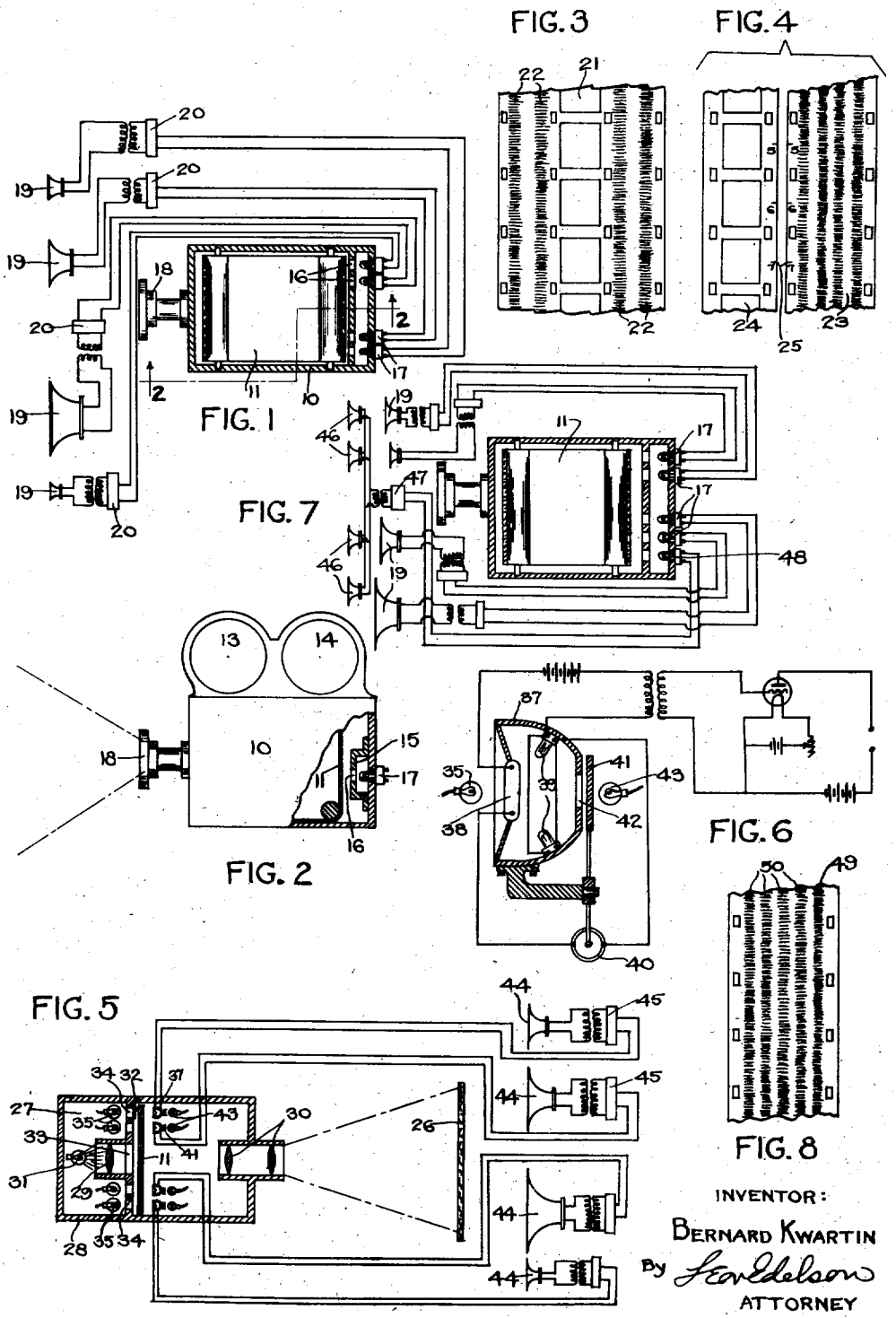
INVENTOR:
BERNARD KWARTIN
By Leo Edelson
ATTORNEY Reissued June 2, 1931 Re. 18,090

UNITED STATES PATENT OFFICE

BERNARD KWARTIN, OF BROOKLYN, NEW YORK

METHOD OF AND APPARATUS FOR RECORDING AND REPRODUCING SOUND

Original No. 1,781,550, dated November 11, 1930, Serial No. 237,322, filed December 2, 1927. Application for reissue filed January 8, 1931. Serial No. 507,510.

This invention relates generally to the art of recording and reproducing light pictures and sound waves simultaneously, and more particularly to an apparatus which is capable of synchronously reproducing light and sound impressions which have been recorded upon a photographic film or the like.

In the production of "talking pictures", this being the commonly accepted term used where pictures and sound records are recorded simultaneously upon a photographic film or the like, many serious difficulties have been encountered in the various attempts to faithfully record and reproduce the sound impressions. These difficulties have been especially great and apparently unsurmountable in the reproduction of ensemble music wherein two or more instruments or voices of distinctly different pitch characteristics must be heard. In the arrangements now generally employed for producing "talking pictures", no attempts have been made to record upon the photographic film the individual sound impressions as produced by the several instruments or voices which make up the ensemble selection and it is primarily for this reason that the results as now attained are so unsatisfactory.

It is among the objects of this invention to obviate the serious difficulties which now tend to preclude the reproduction of more perfect ensemble music by the provision of an arrangement for synchronously reproducing sound impressions of different pitch characteristics which have been previously recorded upon photographic films or the like, the several instruments or voices of different pitch characteristics being individually but synchronously recorded upon a common film for subsequent reproduction in like manner, the arrangement being such that it may be utilized most effectively in the reproduction of orchestral, band or other ensemble instrumental or vocal music in a better, clearer and more perfect manner than is now possible.

A further object of the invention is the provision of an arrangement whereby a plurality of sound reproducing units may be used either independently of each other or conjointly in connection with a single photographic film upon which several instruments or voices of different tones have been individually recorded. This object is of paramount importance where it is desired to attain more perfect reproduction of ensemble music inasmuch as each individual reproducing unit can be provided with the particular type of diaphragm which is best suitable for reproducing a sound of particular character. For instance, for sounds of high pitch, a diaphragm of smaller diameter and less thickness or mass will be found more desirable than one of larger diameter and greater thickness, the latter being more suitable for a sound of lower pitch. A single diaphragm designed to reproduce all sounds, whether they be of high or low pitch, is never satisfactory inasmuch as the best that can be done in such a case is to proportion the diaphragm to sounds of average pitch. Not only does this use of a single diaphragm for reproducing a number of sounds of varying pitches result in sounds, none of which are true in quality, but the fullness and richness of sound volume is also seriously interfered with, especially where it is desired to reproduce a greater number of instruments or voices of varying pitches. The present invention obviates all of these objectionable features by providing an arrangement which is operable to insure the maintenance at all times of the individuality of each instrument or voice brought together in an ensemble rendition.

A still further object of the invention is the provision of an apparatus for recording a plurality of sounds of different pitch characteristics upon a photographic film, either independently or in conjunction with light pictures, the apparatus for this purpose including a plurality of sound responsive devices each of which is designated to individually convert the sound variations emenating from a particular source of sound into electrical variations, these latter variations being then converted into light variations which are subsequently recorded upon a photographic film. Inasmuch as this invention is primarily concerned with the simultaneous reproduction of light pictures and sound waves the particular sound responsive devices which are herein used for converting sound variations into electrical variations are what are known in the art as "microphones". As is well known these microphones depend for their operation upon the effect of the sound waves upon a diaphragm, it being further well known as explained in the preceding paragraph that certain diaphragms, depending upon their size and weight, are more sensitive to certain sounds than are others. The use, therefore, of a number of microphones or similar sound responsive devices, each of which is designed to respond most efficiently to a particular sound of given pitch characteristics, is of great importance in that it enables a better and more perfect record (in this case upon a photographic film) to be had of ensemble music wherein a number of different instruments or voices are employed.

A still further object of the invention is the provision of a method for producing a plurality of individual sound records upon a single photographic film at a film speed corresponding to that used in the production of motion pictures, the method being especially applicable for use in recording ensemble music wherein it is desired to record the individual sounds respectively obtained from the several instruments or voices. Closely allied with this object is the further provision of a method for separately reproducing the sounds as individually recorded upon the photographic film in such manner that the resulting ensemble selection will be rendered in a better, clearer and more perfect manner than is now possible.

A still further object of the invention is the provision of a multiple sound record comprising a photographic film upon which has been individually recorded the sound impressions as produced by different instruments or voices.

A still further object of the invention is the provision of a method for producing a multiple sound record of an ensemble selection simultaneously with the production of a composite sound record of the same selection, such that the latter may be reproduced independently of the former in the usual manner now generally employed.

Other objects, and objects relating to details of construction, arrangement and operation will appear more fully hereinafter.

The invention consists substantially in the combination, construction, location and relative arrangement of parts, as well as in the method employed in connection therewith, all as will be more particularly described hereinafter, as shown in the accompanying drawings, and as finally pointed out in the appended claims.

In the accompanying drawings:

Figure 1 is a diagrammatic view showing an arrangement for simultaneously making motion picture and sound records in accordance with the priciples of this invention;

Figure 2 is a vertical section through the recording apparatus, this section being taken on the line 2—2 of Figure 1;

Figure 3 is a fragmentary view of a combined motion picture and sound record embodying the principles of this invention;

Figure 4 is a view similar to Figure 3 but showing the motion picture record as being separate from the sound record, these records having been simultaneously recorded and adapted for subsequent simultaneous reproduction;

Figure 5 is a diagrammatic view showing an arrangement for simultaneously reproducing the motion pictures and sounds as recorded upon a photographic film in accordance with the principles of this invention;

Figure 6 is a detail view of a preferred form of micro- phot adapted for use in the arrangement shown in Figure 5;

Figure 7 is a view similar to Figure 1 but showing an additional set of microphones, all of which are of the same type and connected through a common amplifier to a common recording lamp for producing a sound record which is auxiliary to that produced by the arrangement shown in Figure 1; and Figure 8 is a fragmentary view of a form of sound record which may be produced by the arrangement of apparatus shown in Figure 7.

Referring now to the drawings, and more particularly to Figure 1 thereof which illustrates more or less diagrammatically the arrangement of apparatus for simultaneously making the picture and sound records, it will be seen that the arrangement employs a camera 10 or similar apparatus for photographically recording motion pictures and sounds. This camera or recording apparatus 10 employs the usual motion picture film 11, which latter is unreeled from the reel 13, during the process of taking the pictures and recording the sound variations, to be subsequently wound upon the reel 14. Secured to the inside surface of the rear wall of the camera and extending transversely thereacross is a quartz or similar opaque plate 15 provided in the opposite ends thereof with one or more small slits or openings 16. In the particular arrangement shown in Figures 1 and 2 these openings 16 are four in number, two being to one side of the plate while the remaining two are to the opposite side thereof, these pairs of openings being spaced apart such that each pair is opposite a marginal edge of the motion picture film. Mounted upon the rear wall of the camera 10 in any suitable manner are a plurality of recording lamps 17 for throwing light rays of varying intensities upon the photographic film, these recording lamps being energized by electrical variations produced through the use of microphones in the manner well-known in the art. These recording lamps 17 are equal in number to the number of openings 15 provided in the opaque cover 16, each lamp being positioned directly behind its respective opening such that the fluctuating light rays emanating from any one of these lamps will produce a record upon the film of the sounds influencing the particular lamp. By properly proportioning the openings 16 the width and length of the beams of light that are directed on the film by the several recording lamps may be rigidly held to the proper limits. It will further be seen that the provision of a number of recording lamps arranged to be individually energized makes it possible to produce upon a common film a corresponding number of sound records, each of which records is produced by the action of different sound waves upon a number of microphones.

The recording of the picture upon the film is carried out in the usual manner by the camera 10, the subject of the picture being positioned in front of the camera lens 18 as is most clearly shown in Figure 1. It may be that this subject is a group of artists playing a number of different instruments, a number of which produce sounds of distinctly different pitch characteristics. Were all of these sounds to be collected for subsequent translation into electrical variations through the use of a single microphone, the record as produced upon the photographic film would not be true and faithful to the sounds as originally produced by the various instruments, this for the reason that the single microphone is not well adapted to take with equal efficiency a number of different sounds of different tonal values.

It is for this reason that the camera 10 is provided with a number of recording lamps for producing upon a single photographic film a corresponding number of sound records, each of these records being of a sound or sounds of substantially similar pitch value. In order to properly segregate the sounds of different pitch as produced by the several instruments when playing in ensemble, a number of microphones 19 are employed, corresponding in number to the number of recording lamps 17 provided in the camera 10. The diaphragms of the microphones 19 are of different diameters and thicknesses, the smallest diaphragm being adapted to take the sounds of highest pitch while the largest diaphragm is adapted to take the sounds of lowest pitch. The diaphragms of intermediate size and weight are adapted to take the sounds of intermediate pitch.

Referring to Figure 1 it will be seen that the several microphones 19 are respectively connected to the recording lamps 17 in the camera, the several microphones being positioned with respect to the source of sound in such manner that each of said microphones takes best the sounds of that particular pitch for which it is designed. The various sound vibrations are changed by the several microphones 19 into corresponding electrical variations, which latter are amplified through individual amplifiers 20, to provide amplified energizing currents for the recording lamps 17.

Figure 3 shows one form of record as produced by the arrangement hereinbefore described, this record comprising a single strip of photographic film upon which have been simultaneously recorded the motion pictures 21 and the sound records 22, it being observed that four of these latter records have been shown. It is, of course, to be understood that a greater or lesser number of sound records may be made upon the photographic film depending altogether upon the number of microphones and sound recording lamps used. In the production of the combined picture and sound record as shown in Figure 3, the sound recording lamps 17 are arranged in the manner shown in Figure 1.

It is quite possible, however, to simultaneously record pictures and sounds upon individual photographic films, these separate records being illustrated in Figure 4. Of course in this latter instance the sound recording lamps 17 are grouped together such that their fluctuating rays of light strike the sound record film 23 which is arranged to one side of the motion picture film 24, this latter being produced in the usual manner. Both the sound record film 23 and the motion picture film 24 are operated at the same speeds during both the recording process and the reproducing process. It sometimes happens, however, that it is necessary to cut out certain portions of the picture film, and where the music is closely allied with the picture it then becomes necessary to also cut out portions of the sound record film. To facilitate proper piecing together of the motion picture and sound record films, they are each provided with suitable marks or numbers 25 on the adjacent marginal edges of the two films, the idea being that the films are to be so arranged that corresponding numbers on the films are always in proper registry.

Figure 5 illustrates more or less diagrammatically an arrangement for reproducing the sounds recorded upon the sound record at the same time that the motion picture is thrown upon a suitable screen 26. In order to effect this simultaneous reproduction of the pictures and sounds a combined picture projection and sound reproducing apparatus is employed, this apparatus being indicated generally by the reference numeral 27. It will be seen that this apparatus 27 comprises a box 28 provided with the usual lenses 29 and 30 and the light source 31. The photographic film 11 travels through the apparatus in the usual manner. In the particular arrangement shown in Figure 5 the record is similar to that shown in Figure 3, the motion pictures being recorded in the central portion of the film while the sound records are recorded upon the film to either side of the motion picture record. The rays of light from the source 31 are so confined that they pass through the central or motion picture record portion of the film. Extending transversely from side to side of the box 28 is an opaque partition 32, the central portion thereof being provided with an opening 33 through which the light rays from the source of light 31 are projected upon the motion picture portion of the film. This partition 32 is further provided with small slits or openings 34 arranged to either side of the central opening 33. These small slits or openings 34 are each in registry with the sound record portions of the film 11. A suitable light source 35 is provided for each of the slits or openings 34 and is arranged with respect to its respective opening in such manner that the rays of light emanating therefrom are directed upon the particular sound record passing in front of said opening.

The sounds as recorded upon the film 11 are reproduced by means of a photo-electric cell or similar device which is influenced by the fluctuating light variations caused by the several sound records passing their respective light sources 35. A separate photo-electric cell is employed for each individual sound record.

As is well-known in the art these photo-electric cells have the property of converting light variations into electrical variations. It sometimes happens, however, that the light variations are not strong enough to influence the photo-electric cells, and for this reason it is preferable to substitute for these photo-electric cells devices hereinafter called "micro-phots".

These micro-phots are designated generally in Figure 5 by the reference numeral 36, one of which is shown in detail in Figure 6. It will be seen that this micro-phot comprises a substantially semi-spherical casing 37 within which is arranged, in any suitable manner, a photo-electric cell or cells 38, this latter cell being adapted to be influenced by the light rays emanating from its primary light source 35. Inasmuch as the sound record is arranged to travel between this light source 35 and the photo-electric cell 38 of the micro-phot, the resulting light rays acting to influence the photo-electric cell 38 will be of varying intensity depending upon the character of the sound impressions recorded upon the photographic film. Within the interior of the micro-phot casing 37 are a plurality of neon tubes 39 which are so influenced by the electrical variations produced by the photo-electric cell that they are caused to light up and so throw additional light rays upon the cell, the result being that the resistance of this cell is still further decreased. Included in the circuit with these neon tubes is a solenoid 40 which is operable, when energized, to cause a shutter 41 at the rear of the micro-phot to move an extent sufficient to uncover a small opening 42 through which still more light from an external source 43 may be directed upon the photo-electric cell 38. The light from this external source 43 also serves to decrease the resistance of the photo-electric cell with the result that the resistance of this cell is reduced to an irreducible minimum, the consequence being that a maximum final flow of current will be obtained which is an exact magnified image of the original current set up under the influence of the fluctuating rays of light caused by the sound record as it passes between the light source 35 and the micro-phot.

It will be understood that a separate micro-phot is employed for each individual sound record, the arrangement of these micro-phots within the projection apparatus being diagrammatically shown in Figure 5. It will further be observed that each of the micro-phots 36 is connected to an individual loud speaker or similar telephone receiver 44 through a separate amplifying circuit 45. These loud speakers 44 are provided with diaphragms of different sizes and weights exactly as in the case of the microphones used in the arrangement for recording the sounds upon the photographic film, the diaphragms of the several loud speakers being so designed that each is best adapted to reproduce sounds of particular pitches. In other words, the diaphragm of any one of the loud speakers 44 which is influenced by one of the sound records on the film 11 is so designed as to be most efficiently responsive to the same frequency of vibration as was the diaphragm of the microphone used in recording the particular sound record in question.

It will be understood that while the arrangement shown in Figure 1 permits the simultaneous reproduction of motion pictures and sounds, the latter may be reproduced independently of the former by the simple expedient of cutting off the light source 31. In similar manner the motion pictures may be reproduced independently of the sound records by cutting off the sources of light 35. Again, it is quite possible by this arrangement to reproduce any one or more of the particular sound records simply by using only the particular light source of sources 35 corresponding to the sound records which it is desired to reproduce. This last mentioned feature is an important one in that it permits the reproduction of the sounds produced by certain of the instruments or voices playing in ensemble, as for instance, when it might be desirable to reproduce the music from a group of violins forming only part of a large group of different instruments, the loud speaker used for this purpose being that which is most responsive to the pitch or tonal qualities of the violins.

Figure 7 shows a modified arrangement wherein, in addition to the microphones 19, each of which is responsive to tones of different pitch, a second set of microphones 46 is employed, each of these latter microphones being of the same design and not individually responsive to tones of different pitch. The sounds as produced, for instance, by an orchestra are commonly collected by this additional set of microphones 46 in the usual manner now generally employed, the electrical variations set up by these microphones being amplified in a common amplifying unit 47. This amplified current is then sent to an auxiliary recording lamp 48 for producing a sound record 49 upon the film of all of the sounds produced by the orchestra. This sound record 49 is auxiliary to the individual records made upon the film in the manner hereinbefore described.

It will be seen that the arrangement shown in Figure 7 makes it possible to produce simultaneously upon the same or separate films two records of the same music, one of these records being divided into a plurality of records of sounds produced by instruments of different pitch, while the other record is of the usual type wherein is included all of the sounds produced by all of the instruments. The record as produced by the arrangement shown in Figure 7 may take the form shown in Figure 8, the composite record being indicated as at 49 and the divided record being indicated as at 50. The importance of producing two such records is that in those cases where it may be too expensive a proposition to employ a number of micro-phots and loud speakers for producing the individual sounds or where perfection of reproduction is not essential, the composite record 49 may be used in conjunction with a single micro-phot and a single reproducing instrument.

Another important feature of the arrangement shown in Figure 7 is that it permits the recording of music in the usual manner simultaneously with the recording of music in the improved manner hereinbefore described. It is, of course, to be understood that the composite record 49 may be recorded upon a film which is separate from and independent of the film upon which the individual sounds of different pitches are recorded, and further that both the composite record 49 and the divided sound record 50 may be made independently of the picture record, so that, if desired, any one of the sound records may be reproduced independently of the picture, or conversely, the picture may be rendered independently of the sound record.

It is to be understood that various changes may be made from time to time in the method, apparatus and arrangement of apparatus hereinbefore described without departing from the spirit or prinicples of the invention, and it is accordingly intended to claim the same broadly, as well as specifically, as indicated by the appended claims.

What is claimed as new and useful is:

1. An apparatus for photographically producing upon a photographic film a plurality of individual records of sounds of distinctly different pitch characteristics, said apparatus comprising a casing, means for moving the film through the casing, a light enclosing chamber arranged to one side of and extending transversely of said film, said chamber being provided with a plurality of transversely spaced slots, a plurality of light sources within said chamber respectively located behind said slots for projecting light rays therethrough, said light sources being independently responsive to different electrical variations corresponding to sound vibrations of different pitch for recording the different sounds upon the film, and a plurality of sound responsive devices having diaphragms of varying mass and size each selectively responsive to sounds of different pitch for producing said different electrical variations.

2. An arrangement for simultaneously recording and simultaneously reproducing sound waves of distinctly different frequencies originating in unison including a plurality of sound responsive devices having diaphragms of different mass and size each selectively responsive to sound waves of different frequencies for converting said sound waves into electrical variations of corresponding frequencies, a plurality of light producing devices arranged for respective energization by the electrical variations set up by the several sound responsive devices, said light producing devices being each adapted to produce a record upon a photographic film of the sound vibrations corresponding to the electrical variations to which it has been subjected, a plurality of light responsive devices each adapted to convert the fluctuating rays of light produced as each of the several records passes a source of light into corresponding electrical variations, and a plurality of sound reproducing devices having diaphragms of different mass and size respectively corresponding to those of said responsive devices and being each electrically connected to one of said light responsive devices for converting the electrical variations set up by the latter into corresponding sound vibrations, said sound reproducing devices being selectively responsive to electrical variations corresponding in frequencies to the original sound waves.

3. In an apparatus for photographically producing a record of sounds, in combination, a plurality of sound responsive devices having diaphragms of varying mass and size each selectively responsive to sound waves of different frequencies for converting said sound waves into electrical variations of corresponding frequencies, an auxiliary sound responsive device having a diaphragm commonly responsive to all of said sound waves, and a plurality of light producing devices respectively included in the electrical circuits of the several sound responsive devices including said auxiliary device, the light producing devices respectively included in the circuits of said plurality of sound responsive devices having diaphragms of varying mass and size being adapted to produce separate records upon a photographic film of the sound vibrations of different frequencies and the light producing device included in the circuit of said auxiliary sound responsive device being adapted to produce a composite record upon a photographic film of all of the sound vibrations.

4. In an apparatus for photographically recording sound vibrations of different frequencies, in combination, means for photographically producing separate records of the sound vibrations of different frequencies and auxiliary means for simultaneously producing photographically a separate and individually reproducible composite record of all of the sound vibrations irrespective of any difference in the frequencies thereof.

5. In an apparatus for photographically recording sound waves of distinctly different frequencies originating in unison, in combination, a plurality of means each selectively responsive to the sound waves of different frequencies for photographically producing individual records of the different sound waves, and additional means commonly responsive to all of the sound waves for simultaneously producing photographically a separate and individually reproducible composite record of all of said sounds.

6. In an apparatus for recording sound waves of distinctly different frequencies originating in unison, in combinaton, a plurality of sound responsive devices having diaphrams of different mass and size each selectively responsive to sound waves of different frequencies, for converting said sound waves into electrical variations of corresponding frequencies, an auxiliary sound responsive device having a diaphram the mass and size of which is an approximate average of those of said first mentioned devices, said auxiliary device being responsive to all of said sound waves, and a plurality of light producing elements respectively included in the electrical circuits of all of the sound responsive devices, said elements being respectively adapted to produce individually and selectively reproducible photographic records of the sound waves respectively received by the several sound responsive devices.

7. In an apparatus for recording the sounds produced by a number of instruments or voices of different pitch characteristics playing in unison, in combination, means for independently and selectively recording upon a photographic film the sounds of different pitches produced by the several instruments or voices, and means for photographically recording a single and individually reproducible composite record of the sounds commonly produced by all of the instruments or voices, said last-mentioned means being operable simultaneously with said first-mentioned means.

8. A method of recording sounds of different frequency characteristics which consists in establishing electrical current variations corresponding to sound vibrations of approximately like frequency, in maintaining the current variations corresponding to the sound vibrations of a given frequency separate and distinct from those corresponding to sound vibrations of a different frequency, in separately establishing electrical current variations corresponding to the composite sound vibrations of dissimilar frequencies, and in respectively subjecting light producing elements to the influence of said different current variations whereby to produce a plurality of separate photographic records of the sound vibrations of different frequency and a separate and independently reproducible composite record of all of said sound vibrations.

In testimony whereof, I have hereunto affixed my signature.

BERNARD KWARTIN.